（12）United States Patent
Takahashi (10) Patent No.: US 12,401,914 B2
(45) Date of Patent: Aug. 26, 2025

(54) VEHICLE IMAGE DISPLAY SYSTEM, VEHICLE IMAGE DISPLAY METHOD, AND STORAGE MEDIUM

(71) Applicant: TOYOTA JIDOSHA KABUSHIKI KAISHA, Toyota (JP)

(72) Inventor: Yuki Takahashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 18/363,063

(22) Filed: Aug. 1, 2023

(65) Prior Publication Data

US 2024/0129638 A1 Apr. 18, 2024

(30) Foreign Application Priority Data

Oct. 12, 2022 (JP) ................. 2022-164313

(51) Int. Cl.
*H04N 7/18* (2006.01)
*B60K 35/00* (2006.01)
*H04N 23/71* (2023.01)
*H04N 23/76* (2023.01)
*B60K 35/22* (2024.01)

(52) U.S. Cl.
CPC ............. *H04N 23/76* (2023.01); *B60K 35/00* (2013.01); *H04N 7/183* (2013.01); *H04N 23/71* (2023.01); *B60K 35/22* (2024.01); *B60K 2360/21* (2024.01); *B60K 2360/349* (2024.01)

(58) Field of Classification Search
CPC ..................................... H04N 23/76
USPC ........................................ 348/148
See application file for complete search history.

(56) References Cited

U.S. PATENT DOCUMENTS

| 7,023,484 | B2 * | 4/2006 | Watanabe | H04N 23/72 348/363 |
|---|---|---|---|---|
| 9,969,261 | B2 | 5/2018 | Kodama | |
| 10,045,173 | B1 | 8/2018 | Morimura et al. | |
| 10,106,157 | B2 | 10/2018 | Sawada et al. | |
| 10,150,407 | B2 | 12/2018 | Takahashi et al. | |
| 10,696,297 | B2 | 6/2020 | Nguyen et al. | |
| 11,001,255 | B2 | 5/2021 | Fukuman et al. | |

(Continued)

FOREIGN PATENT DOCUMENTS

| JP | 2007-251258 A | 9/2007 |
|---|---|---|
| JP | 2009-035162 A | 2/2009 |
| JP | 2020-164148 A | 10/2020 |

*Primary Examiner* — Leron Beck
(74) *Attorney, Agent, or Firm* — SoraIP, Inc.

(57) ABSTRACT

A vehicle image display system includes: a display device for displaying a digital image which is an image based on image data, a dark condition determination unit for determining whether a dark condition is satisfied with respect to the brightness of a surrounding environment of the vehicle, a luminance determination unit for determining whether the image data includes a high luminance pixel, a pixel value determination unit for determining whether a pixel having a pixel value equal to or lower than a second threshold value is not included in a peripheral pixel, and an image adjustment unit for performing a first brightness adjustment process for reducing the brightness of the image data when the dark condition is satisfied and the image data includes a high luminance pixel and the peripheral pixel does not include a pixel having a pixel value equal to or lower than the second threshold value.

5 Claims, 5 Drawing Sheets (56) References Cited

U.S. PATENT DOCUMENTS

| | | |
|---|---|---|
| 11,110,937 B2 | 9/2021 | Kinoshita et al. |
| 2003/0099407 A1* | 5/2003 | Matsushima .......... H04N 23/76 |
| | | 348/E5.119 |
| 2009/0051794 A1* | 2/2009 | Ando ........................ G06T 5/40 |
| | | 348/274 |
| 2010/0321532 A1* | 12/2010 | Hashimoto ............ H04N 23/76 |
| | | 348/E9.053 |
| 2011/0050914 A1* | 3/2011 | Kiuchi ................... H04N 23/75 |
| | | 348/207.11 |
| 2011/0128435 A1* | 6/2011 | Ikeda ..................... H04N 23/71 |
| | | 348/E5.035 |
| 2011/0157425 A1* | 6/2011 | Nakayama ............. H04N 23/71 |
| | | 348/234 |
| 2013/0286175 A1* | 10/2013 | Hashimoto ............ H04N 23/56 |
| | | 348/68 |
| 2019/0001968 A1 | 1/2019 | Yorifuji et al. |
| 2019/0344828 A1 | 11/2019 | Omori et al. |
| 2019/0389488 A1 | 12/2019 | Yamada et al. |
| 2020/0312275 A1 | 10/2020 | Ozeki et al. |

\* cited by examiner

VEHICLE IMAGE DISPLAY SYSTEM, VEHICLE IMAGE DISPLAY METHOD, AND STORAGE MEDIUM

CROSS-REFERENCE TO RELATED APPLICATION

This application claims priority to Japanese Patent Application No. 2022-164313 filed on Oct. 12, 2022 incorporated herein by reference in its entirety.

BACKGROUND

1. Technical Field

The present disclosure relates to a vehicle image display system, a vehicle image display method, and a storage medium.

2. Description of Related Art

In Japanese Unexamined Patent Application Publication No. 2009-035162 (JP 2009-035162 A) described below, when a luminance value of a part of image data (captured image) acquired by a camera is equal to or larger than a predetermined value, image processing for reducing the brightness of the part is performed. In this case, the luminance value of the remaining portion excluding the part of the image data is smaller than the predetermined value. In JP 2009-035162 A, image processing for adjusting the exposure time and the amount of received light of the image data is performed based on the luminance information of the remaining portion. Further, in JP 2009-035162 A, a display device displays the image data subjected to such image processing.

SUMMARY

Here, it is assumed that the above predetermined value is set to a large value. In this case, the brightness of the image data is not reduced when the light emitted by a lighting device of another vehicle directly hits the camera at night. Therefore, the image based on the image data displayed on the display device is blurred. The driver who sees the display device may feel glare. On the other hand, when the above predetermined value is set to a small value, the brightness of image data representing a white subject such as a white line on a road may be reduced more than necessary.

In view of the above, it is an object of the present disclosure to provide a vehicle image display system, a vehicle image display method, and a storage medium that suppress a person who sees a display device that displays a digital image generated by an imaging device from feeling glare when a strong light enters the imaging device and that do not reduce the brightness of the digital image more than necessary.

A vehicle image display system according to claim 1 includes: an imaging device that images a subject located around a vehicle; a display device that displays a digital image that is an image based on image data generated by the imaging device; a dark condition determination unit that determines whether a dark condition is satisfied with respect to a brightness of a surrounding environment of the vehicle; a luminance determination unit that determines whether a high luminance pixel that is a pixel of a luminance equal to or larger than a first threshold value is included in the image data; a pixel value determination unit that determines whether a pixel having a pixel value equal to or smaller than a second threshold value is not included in a peripheral pixel that is a pixel around the high luminance pixel; and an image adjustment unit that performs a first brightness adjustment process for reducing a brightness of the image data, when the dark condition is satisfied and a processing condition is satisfied, the processing condition being a condition that is satisfied when the image data includes the high luminance pixel and the peripheral pixel does not include a pixel having a pixel value equal to or smaller than the second threshold value.

In the vehicle image display system according to claim 1, the processing condition is satisfied when the dark condition determination unit determines that the dark condition is satisfied, the luminance determination unit determines that the image data includes a high luminance pixel that is a pixel having a luminance equal to or larger than the first threshold value, and the pixel value determination unit determines that the peripheral pixel that is a pixel around the high luminance pixel does not include a pixel having a pixel value equal to or smaller than the second threshold value. Further, when the processing condition is satisfied, the image adjustment unit performs the first brightness adjustment process for reducing the brightness of the image data. When a high luminance pixel is included in the image data and a pixel having a pixel value equal to or smaller than the second threshold value is not included in the peripheral pixel due to the strong light entering the imaging device as described above, so-called white blur may have occurred in the peripheral pixel. Therefore, in this case, the first brightness adjustment process for reducing the brightness is performed on the image data. Accordingly, when a strong light enters the imaging device, it is less likely for a person who sees the display device displaying a digital image, which is an image based on the image data, to feel glare.

When the dark condition is not satisfied, the image data does not include a high luminance pixel, or the peripheral pixel includes a pixel having a pixel value equal to or smaller than the second threshold value, there is a high possibility that no white blur has occurred in the digital image based on the peripheral pixel. Therefore, the vehicle image display system according to claim 1 does not perform the first brightness adjustment process on the image data in this case. As a result, the vehicle image display system according to claim 1 does not reduce the brightness of the image data more than necessary in such a case.

In the vehicle image display system according to claim 2, when the dark condition is satisfied and the processing condition is not satisfied, the image adjustment unit performs a second brightness adjustment process different from the first brightness adjustment process on the image data.

In the vehicle image display system according to claim 2, when the dark condition is satisfied and the processing condition is not satisfied, the image adjustment unit performs a second brightness adjustment process different from the first brightness adjustment process on the image data. Therefore, the vehicle image display system according to claim 2 can adjust the brightness of the image data so that the occupant of the vehicle can easily visually recognize the digital image displayed on the display device when the processing condition is not satisfied.

In the vehicle image display system according to claim 3, the dark condition is satisfied when an average luminance of the image data is equal to or smaller than a third threshold value or when an illuminance around the vehicle is equal to or smaller than a fourth threshold value.

The dark condition determination unit of the vehicle image display system according to claim 3 can accurately determine whether the surrounding environment of the vehicle is dark. Therefore, the vehicle image display system according to claim 3 can accurately determine whether there is a risk of occurrence of white blur.

A vehicle image display method according to claim 4 includes: a step of determining whether a dark condition is satisfied with respect to a brightness of a surrounding environment of a vehicle; a step of determining whether a high luminance pixel that is a pixel of a luminance equal to or larger than a first threshold value is included in an image data generated by an imaging device that images a subject located around the vehicle; a step of determining whether a pixel having a pixel value equal to or smaller than a second threshold value is not included in a peripheral pixel that is a pixel around the high luminance pixel; a step of performing a first brightness adjustment process for reducing a brightness of the image data, when the dark condition is satisfied, the image data includes the high luminance pixel, and the peripheral pixel does not include a pixel having a pixel value equal to or smaller than the second threshold value; and a step of displaying a digital image that is an image based on the image data subjected to the first brightness adjustment process.

A storage medium according to claim 5 stores a program causing a computer to execute processes including: a process of determining whether a dark condition is satisfied with respect to a brightness of a surrounding environment of a vehicle; a process of determining whether a high luminance pixel that is a pixel of a luminance equal to or larger than a first threshold value is included in an image data generated by an imaging device that images a subject located around the vehicle; a process of determining whether a pixel having a pixel value equal to or smaller than a second threshold value is not included in a peripheral pixel that is a pixel around the high luminance pixel; a process of performing a first brightness adjustment process for reducing a brightness of the image data, when the dark condition is satisfied, the image data includes the high luminance pixel, and the peripheral pixel does not include a pixel having a pixel value equal to or smaller than the second threshold value; and a process of displaying a digital image that is an image based on the image data subjected to the first brightness adjustment process.

As described above, the vehicle image display system, the vehicle image display method, and the storage medium according to the present disclosure have an excellent effect that a person who sees a display device that displays a digital image generated by an imaging device is suppressed from feeling glare when a strong light enters the imaging device and that the brightness of the digital image is not reduced more than necessary.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a vehicle image display system, a vehicle image display method, and a program according to the present disclosure will be described with reference to the drawings.

Figure 1:
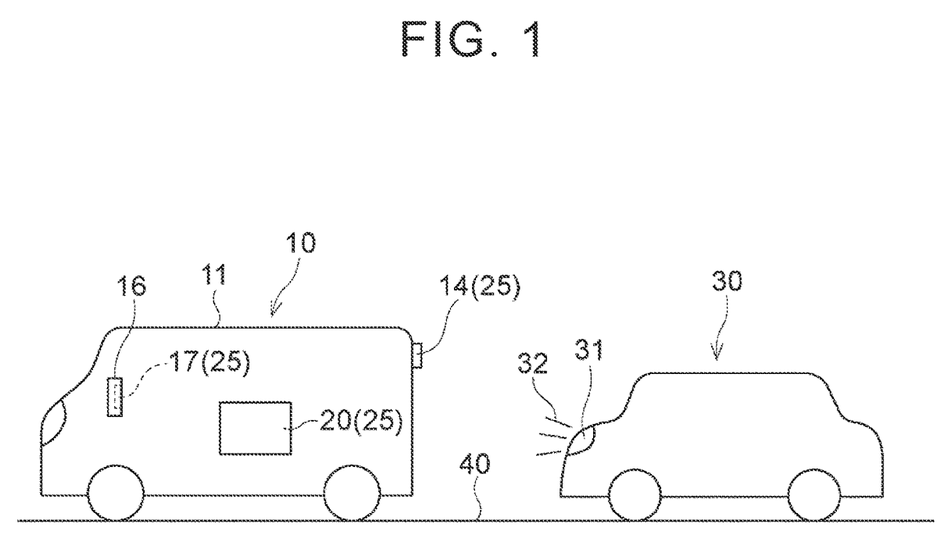
FIG. 1 is a side view of a vehicle and a subsequent vehicle on which a vehicle image display system according to an embodiment is mounted.

The vehicle 10 shown in FIG. 1 is equipped with a vehicle image display system 25 (hereinafter, system 25). The vehicle 10 includes a vehicle body 11, a camera (imaging device) 14, a rearview mirror 16, and an ECU 20. It should be noted that the vehicles 10 can execute driving assistance control of the level 1 to the level 5 determined by Society of Automotive Engineers (SAE) (American Automotive Engineering Association). Further, the brightness adjustment processing described below can be executed while the vehicle 10 executes the driving assistance control and during the execution of the manual driving.

A camera 14 is provided at a rear portion of the vehicle body 11. The camera 14 includes an image sensor and a lens (both not shown). The image sensor includes a pixel array unit having a plurality of pixels (dots). Each pixel outputs the light incident on the pixel array unit via the lens as an electric signal. Further, the image sensor includes an exposure adjustment system (electronic shutter).

The camera 14 is capable of capturing an image of a subject located behind the vehicle 10. For example, as shown in FIG. 1, when the vehicle 10 is traveling forward on the road 40, the camera 14 is capable of capturing an image of a succeeding vehicle (subject) 30 traveling forward on the road 40 behind the vehicle 10. A pair of left and right lighting devices 31 (only the lighting device 31 on the left side is shown in FIG. 1) is provided at the front end portion of the following vehicle 30.

A rearview mirror 16 is provided inside the vehicle 10. A digital display device 17 that displays a digital image based on the image data generated by the camera 14 is provided on the rear surface of the rearview mirror 16. The display device 17 includes a plurality of pixels (dots).

Vehicle 10 comprises an Electronic Control Unit (ECU) 20. The cameras 14, the display device 17, and ECU 20 are components of the vehicle image display system 25.

Figure 2:
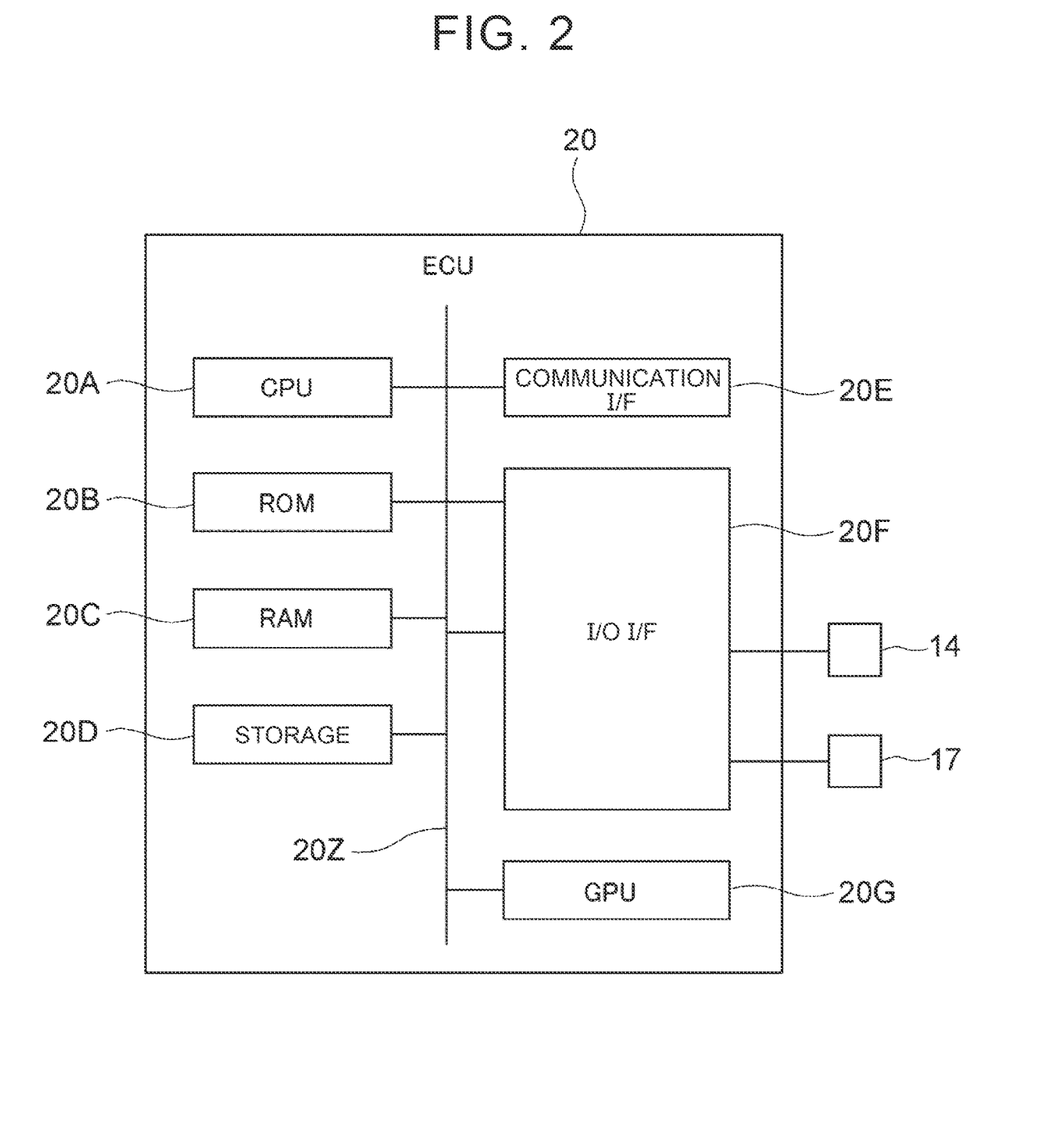
FIG. 2 is a control diagram of an ECU mounted on vehicles.

As illustrated in FIG. 2, ECU 20 includes a Central Processing Unit (CPU) (processor) (computer) 20A, Read Only Memory (ROM) 20B, Random Access Memory (RAM) 20C, a storage 20D, a communication Inter Face (I/F) 20E, an input/output I/F 20F, and a Graphics Processing Unit (GPU) 20G. CPU 20A, ROM 20B, RAM 20C, the storage 20D, the communication I/F 20E, the input/output I/F 20F, and GPU 20G are communicably connected to each other via a bus 20Z.

CPU 20A is a central processing unit. CPU 20A executes various programs and controls each unit. That is, CPU 20A reads the program from ROM 20B or the storage 20D, and executes the program using RAM 20C as a working area. In accordance with the programs recorded in ROM 20B or the storage 20D, CPU 20A performs control of the respective components and various arithmetic processes (information processing).

ROM 20B stores various programs and various data. RAM 20C temporarily stores a program/data as a working area. The storage 20D is constituted by a storage device such as Hard Disk Drive (HDD) or Solid State Drive (SSD). The storage 20D stores various programs and various data. The ROM 20B and the storage 20D are examples of a storage medium. A communication I/F 20E is an interface through which an ECU 20 communicates with other devices. The input/output T/F 20F are interfaces for communicating with various devices. For example, the camera 14 and the display device 17 are connected to the input/output I/F 20F.

GPU 20G is an arithmetic unit for image-processing. GPU 20G reads a program from a ROM 20B or a storage 20D, and executes the program using RAM 20C as a working area.

Figure 3:
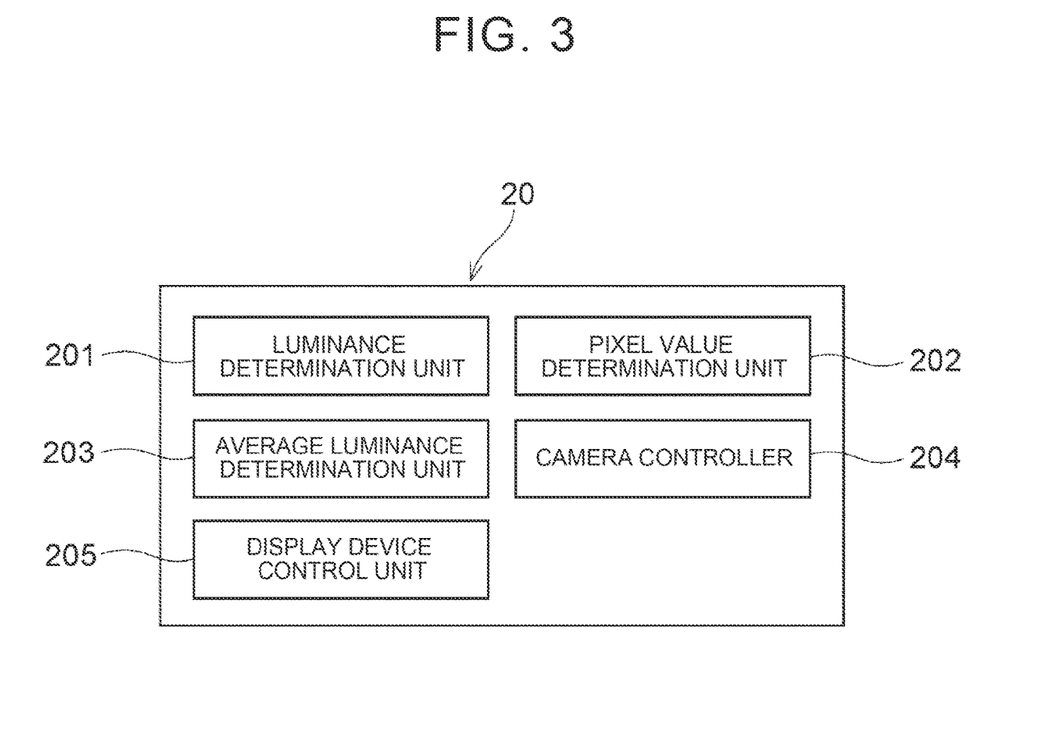
FIG. 3 is a functional diagram of an ECU.

FIG. 3 shows a functional diagram of an ECU 20. ECU 20 includes a luminance determination unit 201, a pixel value determination unit 202, an averaged luminance determination unit (dark condition determination unit) 203, a camera control unit (image adjustment unit) 204, and a display device control unit 205 as functional components. These are realized by a CPU 20A and a GPU 20G reading and executing a program stored in a ROM 20B.

The luminance determination unit 201 measures the luminance of all the pixels included in the image data received from the camera 14. In addition, the luminance determination unit 201 determines whether or not a high-luminance pixel is included in these pixels. The high-luminance pixel is a pixel having a luminance equal to or higher than the first threshold. The first threshold value is, for example, a maximum luminance value (255).

The pixel value determination unit 202 measures pixel values of all pixels included in the image data received from the camera 14. In addition, the pixel value determination unit 202 determines whether or not a pixel having a pixel value equal to or less than the second threshold value is included in these pixels. When a pixel having a pixel value equal to or less than the second threshold value is displayed on the display device 17, the occupant who views the display device 17 recognizes the image represented by the pixel as black.

The average luminance determination unit 203 measures the average luminance of all the pixels included in the image data received from the camera 14. The average luminance determination unit 203 determines whether or not the average luminance is equal to or less than the third threshold value.

The camera control unit 204 has a brightness adjustment function. That is, the camera control unit 204 controls the camera 14. Thus, the camera control unit 204 can execute the brightness adjustment process. The brightness adjustment processing is processing for adjusting the brightness of all the pixels included in the image data. The brightness adjustment processing includes a first brightness adjustment processing, a second brightness adjustment processing, and a third brightness adjustment processing, which will be described later. The camera control unit 204 adjusts the brightness of the entire image data (all pixels) based on the average luminance values of all the pixels included in the image data. More specifically, the camera control unit 204 executes brightness adjustment processing by at least one of exposure adjustment and gain adjustment. The camera control unit 204 calculates an exposure time based on the average luminance value. The camera control unit 204 controls an exposure adjustment system (electronic shutter) of the camera 14 based on the calculated exposure time information. The camera control unit 204 adjusts an amplification factor (gain) of an electric signal output from all the pixels (dots) of the image sensor based on the average luminance value.

The display device control unit 205 outputs the image data whose brightness has been adjusted to the display device 17. The display device control unit 205 causes the display device 17 to display a digital image based on the image data.

Figure 5:
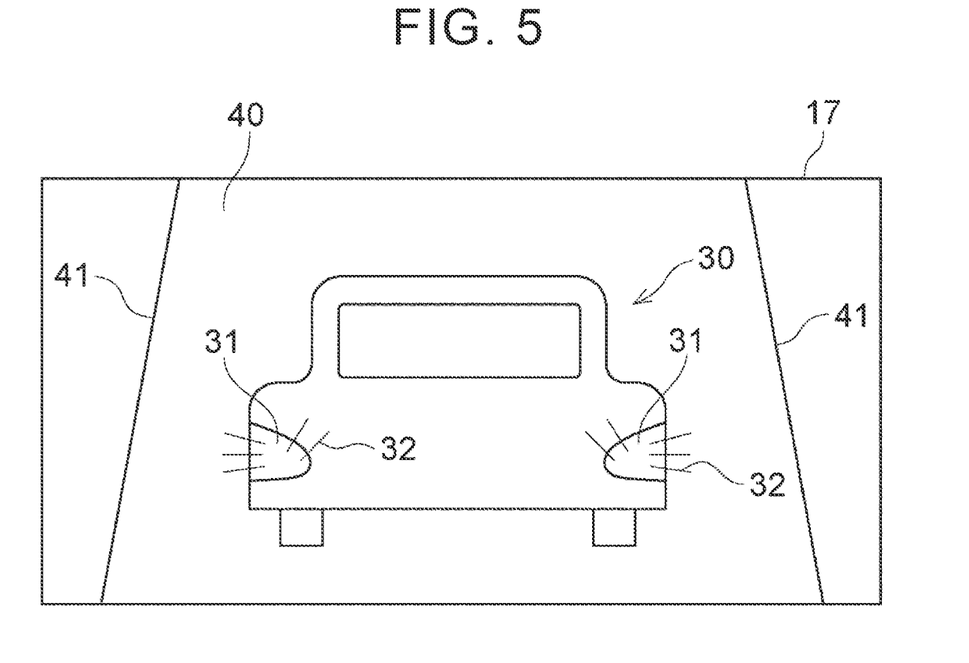
FIG. 5 is a diagram showing a display device of a rearview mirror displaying digital images in which white blur has occurred.
Figure 6:
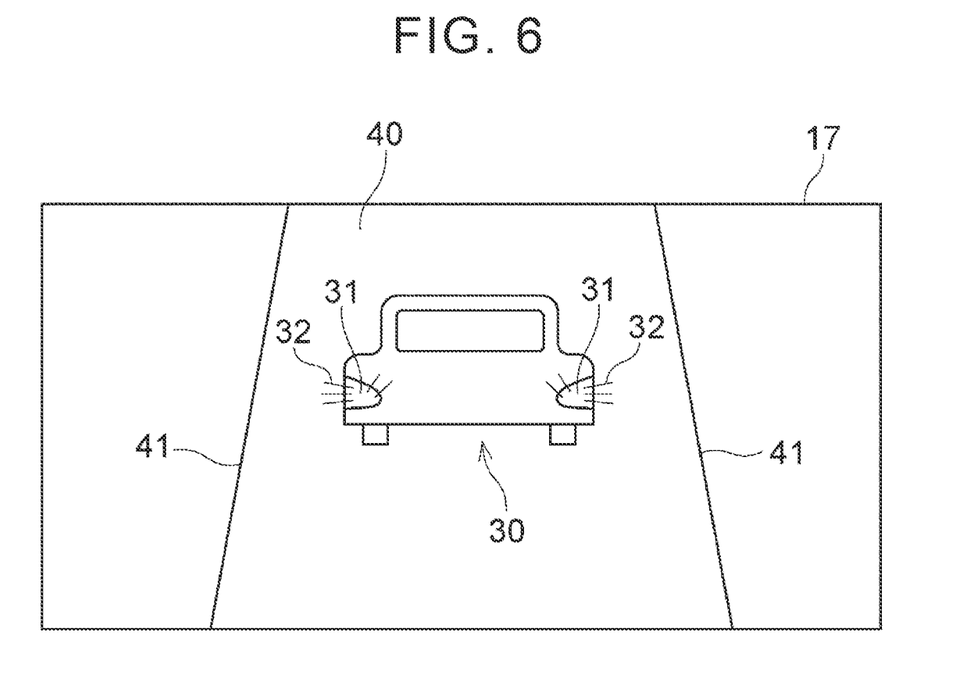
FIG. 6 is a diagram illustrating a display device of a rearview mirror displaying a digital image in which white blur does not occur.

Next, the flow of the process performed by ECU 20 will be described with reference to the flow chart of FIG. 4. It is assumed that, as shown in FIG. 1, the vehicle 10 and the following vehicle 30 travel forward on the road 40, and the lighting device 31 of the following vehicle 30 emits the illumination light 32 toward the front. Further, as shown in FIGS. 5 and 6, the camera 14 photographs the following vehicle 30. It is assumed that a digital image representing the following vehicle 30 is displayed on the display device 17 of the rearview mirror 16. Note that reference numeral 41 in FIG. 5 and FIG. 6 is a white line indicating both side edges of the road 40.

First, in S10 (hereinafter, the characters of "steps" are omitted), ECU 20 (average luminance determination unit 203) measures the average luminance of all the pixels included in the image data received from the camera 14. Further, ECU 20 determines whether the mean brightness is less than or equal to the third threshold.

When Yes is determined by S10, it is highly likely that the surrounding environment of the vehicles 10 is a dark environment. For example, it is highly likely that the vehicle 10 is traveling on the road 40 at night. When Yes is determined in S10, a predetermined dark condition is satisfied. On the other hand, when it is determined that S10 is No, it is highly likely that the surrounding environment of the vehicle 10 is a bright environment. For example, it is highly likely that the vehicle 10 is traveling on the road 40 in the daytime.

When Yes is determined in S10, ECU 20 proceeds to S11. In S11, ECU 20 determines whether or not all the pixels included in the image data received from the camera 14 include high-luminance pixels. The high-luminance pixel is a pixel having a luminance equal to or higher than the first threshold.

FIG. 5 shows the display device 17 when the inter-vehicle distance between the vehicle 10 and the following vehicle 30 is short. At this time, a large amount of light flux included in the illumination light 32 emitted from the lighting device 31 of the following vehicle 30 is received by the camera 14 (imaging element). That is, strong light enters the camera 14 (image sensor). In such cases, ECU 20 determines that the high-brightness pixels are included in the images received from the cameras 14. Pixels (pixels) of the image data representing at least a part of the lighting device 31 are high-luminance pixels.

On the other hand, FIG. 6 shows the display device 17 when the distance between the vehicle 10 and the following vehicle 30 is long. At this time, a small amount of light flux included in the illumination light 32 emitted from the lighting device 31 of the following vehicle 30 is received by the camera 14 (imaging element). That is, no strong light enters the camera 14 (image sensor). In such cases, ECU 20 determines that the high-brightness pixels are not included in the images received from the cameras 14.

When Yes is determined in S11, ECU 20 proceeds to S12. ECU 20 measures pixel values of all pixels included in the image data received from the camera 14. In addition, ECU 20 determines whether or not a pixel having a pixel value equal to or less than the second threshold value is included in a peripheral pixel that is a pixel around the high-luminance pixel. The range of the peripheral pixel may be, for example, a predetermined multiple of the range of the high-luminance pixel. The range of the peripheral pixels may be a range in which the entire object having the light source (the following vehicle 30 in the present embodiment) is included.

When it is determined that S12 is No, a predetermined process condition is satisfied. When S12 is determined to be No and the first brightness adjusting process is not performed, the digital images displayed on the display device 17 are highly likely to have so-called white blur. The image data (pixels) generated by a specific pixel included in the pixel array portion of the image sensor and being a part of the pixels (dots) that have received strong light is a high-luminance pixel. In this case, light that cannot be absorbed by a specific pixel (dot) is absorbed by a peripheral pixel that is a pixel (dot) around the specific pixel. Therefore, when the first brightness adjustment process is not performed, the occupant recognizes that the digital image based on the peripheral pixels generated by the peripheral pixels (dots) of the image sensor is blurred.

On the other hand, if a pixel having a pixel value equal to or less than the second threshold value is included in the peripheral pixel of the image data, ECU 20 determines that the pixel value is Yes in S12. In this case, it is unlikely that white blur has occurred in the digital image displayed on the display device 17.

If S12 determines No, ECU 20 proceeds to S13. ECU 20 performs a first brightness adjusting process of reducing brightness of all pixels of the image data. That is, ECU 20 performs at least one of the exposure adjustment and the gain adjustment based on the mean brightness of all the pixels acquired by S10.

The brightness of the pixel of the image data prior to the brightness adjustment process being executed is referred to as the initial-brightness BR1. The brightness after the brightness adjustment process is executed is referred to as a corrected brightness BR2. Furthermore, the difference between the initial brightness BR1 and the corrected brightness BR2 is referred to as a brightness reduction amount BRA (=initial brightness BR1−corrected brightness BR2).

Also, when No is determined by S11 or Yes is determined by S12, ECU 20 proceeds to S14. ECU 20 performs a second brightness adjusting process based on the mean brightness of all the pixels acquired by S10. The second brightness adjustment process is a process of adjusting the brightness of all the pixels of the image data. The second brightness adjustment process is a process of adjusting the brightness of the image data so that the occupant of the vehicle 10 can easily visually recognize the digital image displayed on the display device 17 when the digital image displayed on the display device 17 is unlikely to be blurred and the surrounding environment of the vehicle 10 is a dark environment. Note that the brightness reduction amount BRA in the case where the brightness of the image-data is reduced by the second brightness adjustment processing is smaller than in the case where the first brightness adjustment processing is executed. That is, by the second brightness adjustment processing, for example, the brightness of the image data on which the digital image representing the white line 41 shown in FIG. 6 is based is not unnecessarily reduced. Therefore, the occupant who views the display device 17 shown in FIG. 6 can clearly view the white line 41.

If S10 determines No, ECU 20 proceeds to S15. ECU 20 performs a third brightness adjustment process of adjusting the brightness of all the pixels of the image data based on the mean brightness of all the pixels acquired by S10. The third brightness adjustment processing is processing for adjusting the brightness of the image data so that the occupant of the vehicle 10 can easily visually recognize the digital image displayed on the display device 17 when the surrounding environment of the vehicle 10 is a bright environment. Therefore, in the third brightness adjustment processing, the brightness of the image data is not reduced.

When S15 has been processed from S13, ECU 20 proceeds to S16. ECU 20 transmits the image-data subjected to the brightness adjusting process to the display device 17. Therefore, the display device 17 displays a digital image based on the image data subjected to the brightness adjustment processing.

Figure 4:
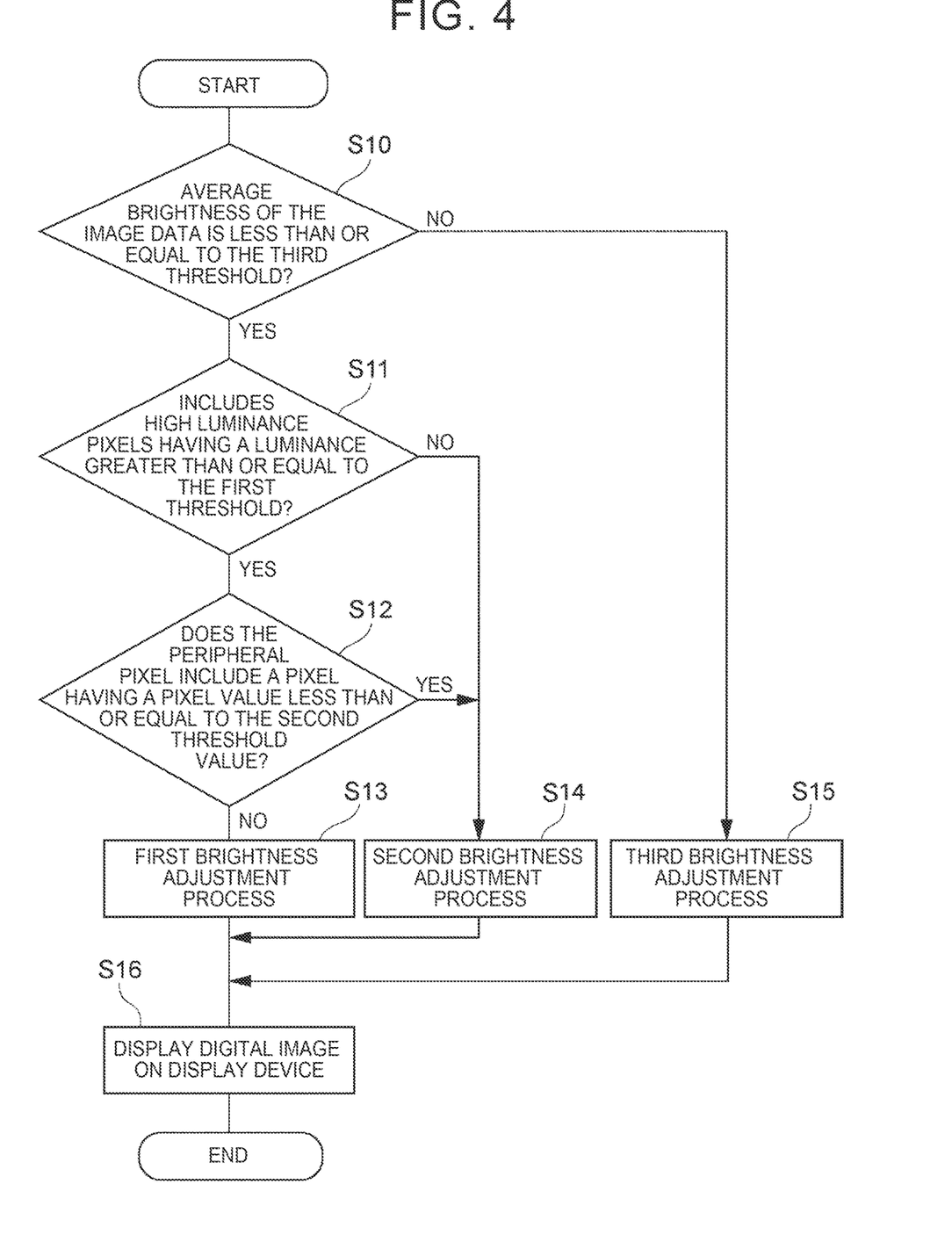
FIG. 4 is a flow chart illustrating a process executed by CPU.

When the process of S16 is completed, ECU 20 temporarily ends the process of the flow chart of FIG. 4.

As described above, when the dark condition is satisfied, the image data includes a high-luminance pixel that is a pixel having a luminance equal to or higher than the first threshold value, and the peripheral pixel does not include a pixel having a pixel value equal to or lower than the second threshold value, the system 25 of the present embodiment determines that the predetermined processing condition is satisfied. That is, based on whether or not pixels having pixel values equal to or less than the second threshold value are included in the image data, the system 25 determines whether or not the digital image displayed on the display device 17 is highly likely to be blurred. When the determination is made based on the pixel value as described above, it is determined with high accuracy whether or not the digital image displayed on the display device 17 is highly likely to be blurred. Further, when the processing condition is satisfied, the system 25 executes the first brightness adjustment processing for suppressing the occurrence of the white blur with respect to the image data. Therefore, it is difficult for a person who views the display device 17 displaying the digital image based on the image data subjected to the first brightness adjustment processing to feel glare.

On the other hand, if the dark condition is not satisfied, if the image data does not include a high-luminance pixel, or if the peripheral pixel includes a pixel having a pixel value equal to or smaller than the second threshold value, it is considered that the possibility of occurrence of white blur in the peripheral pixel is low. Therefore, the system 25 does not perform the first brightness adjustment process on the image data in this case. That is, when the processing condition is not satisfied, the system 25 does not unnecessarily reduce the brightness of the image data.

Further, the system 25 executes a second brightness adjustment process different from the first brightness adjustment process in a case where the high-luminance pixel is not included in the image data or in a case where the peripheral pixel includes a pixel having a pixel value equal to or smaller than the second threshold. That is, in this case, the system 25 adjusts the brightness of the image data so that the occupant of the vehicle 10 can easily visually recognize the digital image displayed on the display device 17.

Further, the system 25 determines that the dark condition is satisfied when the average luminance of the image data is equal to or less than the third threshold value. Therefore, the system 25 can accurately determine whether or not the surrounding environment of the vehicle 10 is dark. Therefore, the system 25 can accurately determine whether or not there is a risk of occurrence of white blur in the display device 17.

The vehicle image display system, the vehicle image display method, and the program according to the embodiment have been described above. However, the vehicle image display system, the vehicle image display method, and the program can be appropriately changed in design without departing from the gist of the present disclosure.

For example, the vehicle 10 may include an illuminance detection device that detects illuminance around the vehicle 10. When the illuminance detected by the illuminance detecting device is equal to or less than the fourth threshold, ECU 20 may determine that the dark condition is satisfied.

The camera 14 may include a variable diaphragm device facing the image sensor. In this case, ECU 20 may perform the brightness adjustment process by adjusting the aperture diameter of the variable aperture device.

ECU 20 may perform the brightness adjusting process by performing the image processing on the image data.

The display device 17 may be a display device provided on an instrument panel of the vehicle 10.

The camera 14 may be a camera capable of capturing an image of a subject located in a direction different from the rear of the vehicle 10.

The vehicle 10 may include a detection device capable of detecting another vehicle located in the vicinity of the vehicle 10 and detecting a distance between the vehicle 10 and another vehicle. When no other vehicle is detected, or when the distance between the vehicle 10 and the other vehicle is equal to or greater than a predetermined value, ECU 20 may determine that the possibility of the occurrence of the white blur is low.

Additional Remarks

The vehicle image display system of the present disclosure may be any combination of the following configurations 1 to 5.

<Configuration 1> A vehicle image display system includes an imaging device, a display device, a dark condition determination unit, a luminance determination unit, a pixel value determination unit, and an image adjustment unit. The imaging device images a subject located around a vehicle. The display device displays a digital image that is an image based on image data generated by the imaging device. The dark condition determination unit determines whether a dark condition is satisfied with respect to a brightness of a surrounding environment of the vehicle. The luminance determination unit determines whether a high luminance pixel that is a pixel of a luminance equal to or larger than a first threshold value is included in the image data. The pixel value determination unit determines whether a pixel having a pixel value equal to or smaller than a second threshold value is not included in a peripheral pixel that is a pixel around the high luminance pixel. The image adjustment unit performs a first brightness adjustment process for reducing a brightness of the image data, when the dark condition is satisfied and a processing condition is satisfied, the processing condition being a condition that is satisfied when the image data includes the high luminance pixel and the peripheral pixel does not include a pixel having a pixel value equal to or smaller than the second threshold value.

<Configuration 2> In the vehicle image display system, when the dark condition is satisfied and the processing condition is not satisfied, the image adjustment unit performs a second brightness adjustment process different from the first brightness adjustment process on the image data.

<Configuration 3> In the vehicle image display system, the dark condition is satisfied when an average luminance of the image data is equal to or smaller than a third threshold value or when an illuminance around the vehicle is equal to or smaller than a fourth threshold value. Further, the vehicle image display method of the present disclosure may be a combination of the following configuration 4 and at least one of the configurations 1 to 3.

<Configuration 4> The vehicle image display method includes: a step of determining whether a dark condition is satisfied with respect to a brightness of a surrounding environment of a vehicle; a step of determining whether a high luminance pixel that is a pixel of a luminance equal to or larger than a first threshold value is included in an image data generated by an imaging device that images a subject located around the vehicle; a step of determining whether a pixel having a pixel value equal to or smaller than a second threshold value is not included in a peripheral pixel that is a pixel around the high luminance pixel; a step of performing a first brightness adjustment process for reducing a brightness of the image data, when the dark condition is satisfied and a processing condition is satisfied, the processing condition being a condition that is satisfied when the image data includes the high luminance pixel and the peripheral pixel does not include a pixel having a pixel value equal to or smaller than the second threshold value; and a step of displaying a digital image that is an image based on the image data subjected to the first brightness adjustment process. Further, the program of the present disclosure may be a combination of the following configuration 5 and at least one of the configurations 1 to 3.

<Configuration 5> The program causes a computer to execute processes including: a process of determining whether a dark condition is satisfied with respect to a brightness of a surrounding environment of a vehicle; a process of determining whether a high luminance pixel that is a pixel of a luminance equal to or larger than a first threshold value is included in an image data generated by an imaging device that images a subject located around the vehicle; a process of determining whether a pixel having a pixel value equal to or smaller than a second threshold value is not included in a peripheral pixel that is a pixel around the high luminance pixel; a process of performing a first brightness adjustment process for reducing a brightness of the image data, when the dark condition is satisfied and a processing condition is satisfied, the processing condition being a condition that is satisfied when the image data includes the high luminance pixel and the peripheral pixel does not include a pixel having a pixel value equal to or smaller than the second threshold value; and a process of displaying a digital image that is an image based on the image data subjected to the first brightness adjustment process.

What is claimed is:

1. A vehicle image display system comprising:
an imaging device that images a subject located around a vehicle;
a display device that displays a digital image that is an image based on image data generated by the imaging device;
a dark condition determination unit that determines whether a dark condition is satisfied with respect to a brightness of a surrounding environment of the vehicle;
a luminance determination unit that determines whether a high luminance pixel that is a pixel of a luminance equal to or larger than a first threshold value is included in the image data;
a pixel value determination unit that determines whether a pixel having a pixel value equal to or smaller than a second threshold value is not included in a peripheral pixel that is a pixel around the high luminance pixel; and an image adjustment unit that performs a first brightness adjustment process for reducing a brightness of the image data, when the dark condition is satisfied and a processing condition is satisfied, the processing condition being a condition that is satisfied when the image data includes the high luminance pixel and the peripheral pixel does not include a pixel having a pixel value equal to or smaller than the second threshold value.

2. The vehicle image display system according to claim 1, wherein when the dark condition is satisfied and the processing condition is not satisfied, the image adjustment unit performs a second brightness adjustment process different from the first brightness adjustment process on the image data.

3. The vehicle image display system according to claim 1, wherein the dark condition is satisfied when an average luminance of the image data is equal to or smaller than a third threshold value or when an illuminance around the vehicle is equal to or smaller than a fourth threshold value.

4. A vehicle image display method comprising:
- a step of determining whether a dark condition is satisfied with respect to a brightness of a surrounding environment of a vehicle;
- a step of determining whether a high luminance pixel that is a pixel of a luminance equal to or larger than a first threshold value is included in an image data generated by an imaging device that images a subject located around the vehicle;
- a step of determining whether a pixel having a pixel value equal to or smaller than a second threshold value is not included in a peripheral pixel that is a pixel around the high luminance pixel;
- a step of performing a first brightness adjustment process for reducing a brightness of the image data, when the dark condition is satisfied, the image data includes the high luminance pixel, and the peripheral pixel does not include a pixel having a pixel value equal to or smaller than the second threshold value; and
- a step of displaying a digital image that is an image based on the image data subjected to the first brightness adjustment process.

5. A non-transitory storage medium storing a program that causes a computer to execute processes comprising:
- a process of determining whether a dark condition is satisfied with respect to a brightness of a surrounding environment of a vehicle;
- a process of determining whether a high luminance pixel that is a pixel of a luminance equal to or larger than a first threshold value is included in an image data generated by an imaging device that images a subject located around the vehicle;
- a process of determining whether a pixel having a pixel value equal to or smaller than a second threshold value is not included in a peripheral pixel that is a pixel around the high luminance pixel;
- a process of performing a first brightness adjustment process for reducing a brightness of the image data, when the dark condition is satisfied, the image data includes the high luminance pixel, and the peripheral pixel does not include a pixel having a pixel value equal to or smaller than the second threshold value; and
- a process of displaying a digital image that is an image based on the image data subjected to the first brightness adjustment process.

\* \* \* \* \*